Jan. 2, 1934.  H. C. WELLMAN  1,942,230

SAFETY SCREEN FOR MOTION PICTURE APPARATUS

Filed Sept. 5, 1931

Inventor:
Howard C. Wellman,
By Newton M. Perrins
George A. Gillette, Jr.
Attorneys.

Patented Jan. 2, 1934

1,942,230

UNITED STATES PATENT OFFICE 1,942,230

SAFETY SCREEN FOR MOTION PICTURE APPARATUS

Howard C. Wellman, Rochester, N. Y., assignor to Eastman Kodak Company, Rochester, N. Y., a corporation of New York Application September 5, 1931. Serial No. 561,424

14 Claims. (Cl. 88—19.4)

The present invention relates to a safety screen for motion picture apparatus and more particularly to a safety screen which intercepts the light beam in projection types of motion picture apparatus and which is moved out of the light beam when surrounding circumstances attain a predetermined condition.

Particular care must be exercised in projecting a light beam through photographic film which has a cellulosic base, inasmuch as the intensity of the light beam for satisfactory projection of images on the film must be so great that the film is very likely to become ignited. This source of danger in the projection of light through photographic film has been recognized for a considerable time and many known devices provide a safety shutter or screen which protects the film when stationary or traveling at slow speeds and which is automatically removed from the light beam when the travel of the film has increased to such a degree that the film is in no danger of being ignited although exposed to the direct rays of the light source. The known devices for effecting the movement of such a safety shutter or screen are all quite complicated or subject to failure.

The primary object of the present invention is the provision of a simple but effective safety screen which normally intercepts the light beam of a motion picture apparatus and which is automatically moved out of said light beam when the film is moving at or above a predetermined rate of speed.

A further object of the present invention is the provision of a safety screen which protects the film in a motion picture apparatus from ignition by the light beam and which is directly operated by the shutter of the motion picture apparatus.

Another object of the present invention is the provision of a safety screen which is in frictional engagement with the shutter of the motion picture apparatus, said frictional engagement being increased by a centrifugal means acting directly upon the safety screen.

A still further object of the present invention is the provision of a centrifugal means which is mounted within an end slot provided in the shutter shaft and which includes a pair of bell cranks pivotally mounted about a common axis in the end slot of the shaft, each bell crank having a weighted arm and a cam portion on the other arm for engaging and moving a safety screen to increase the frictional engagement between the safety screen and shutter so that the safety screen turns with the shutter when said frictional engagement attains a predetermined value.

Still another object of the present invention is to provide a safety screen which prevents the heat rays from burning the film but which may permit sufficient light rays to pass for the projection of still pictures without damaging the film.

With these objects in view, the present invention consists in certain features of novelty in the construction, combination, and arrangement of parts by which the said objects and certain other objects are effected, all as fully described in the accompanying drawing and more particularly pointed out in the appended claims. Reference is hereby made to the accompanying drawing wherein similar elements are designated by similar reference numerals and wherein:

Figure 1:
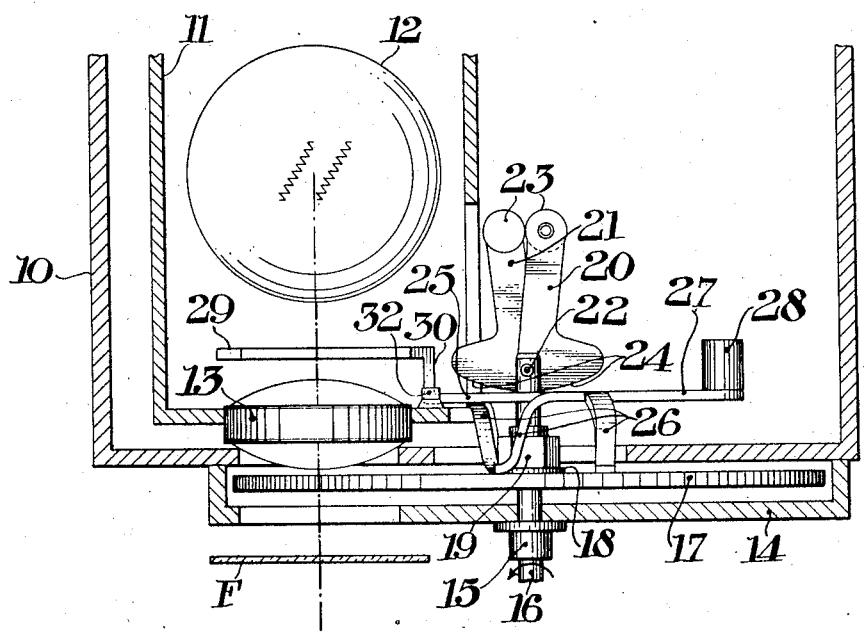
Fig. 1 is a plan view of the safety screen according to the present invention and showing its location in a motion picture projector, portions of the projector casing being cross sectioned for clearer illustration of the safety screen.
Figure 2:
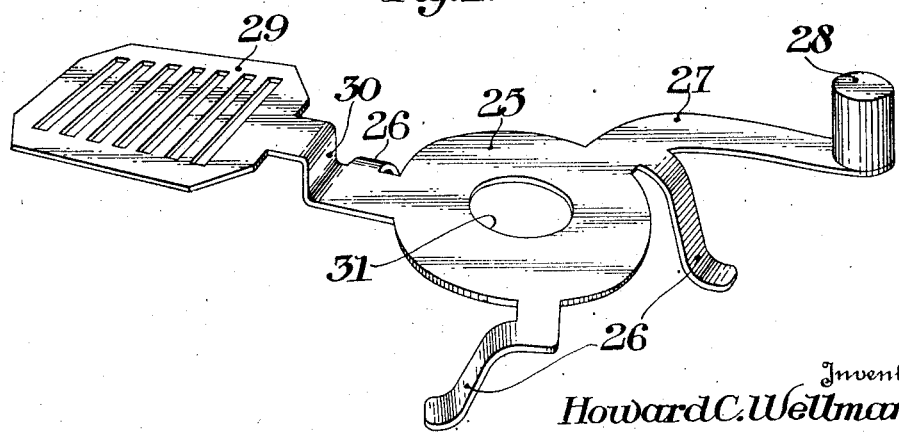
Fig. 2 is a perspective view of the safety screen according to the invention.

In the illustrated embodiment, the safety screen is shown in cooperation with the known elements of a motion picture projector, however, it is to be understood that such a safety screen may be used under any circumstances which require the protection of a stationary or slow moving film from the total direct rays of a light source.

The projector casing 10 contains a lamp housing 11 within which a light source such as an incandescent lamp 12 is mounted. A condenser lens assembly 13 is located between suitable apertures in the projector casing 10 and lamp housing 11. A shutter housing 14 is mounted on the front of the projector casing 10 and is provided with an aperture registering with the aforementioned apertures in casing 10 and housing 11. A bearing 15 is centrally located on the shutter housing 14 for the support of a shutter shaft 16. A disc shutter 17 is mounted upon shaft 16 by means of a washer 18 and a nut 19. The film F is advanced through the light beam from the light source in any known manner.

The elements thus far described are well known in the motion picture art and form no part of the present invention except insofar as they enter into combination with the parts of the apparatus to be described hereinafter.

The end of shaft 16 is provided with an end slot within which a pair of bell cranks 20 and 21 are pivoted. For this purpose a pin 22 passes through the end slot 16 and through intermediate portions of bell cranks 20 and 21 so that the same are mounted to pivot about a common axis. The bell cranks 20 and 21 each have a weight 23 located at the end of one arm and have a cam portion 24 on the other arm.

The screen member comprises a central portion 25 which has a plurality of integral resilient arms 26 bent out of the plane of portion 25. An arm 27 extends from central portion 25 of the screen member and has a weight 28 mounted on the end thereof. A grid member 29 is provided with a plurality of slots in a known manner and is attached to the central portion 25 substantially opposite the arm 27, being preferably slightly offset as at 30 to clear the condenser lens assembly 13 when mounted in the apparatus. A hole 31 is provided in the central portion 25 of the screen member and is located between the grid member 29 and the center gravity of the screen member.

The screen member is mounted in the projector so that hole 31 loosely encircles the shutter shaft 16. In this position the central portion 25 of the screen member is adjacent the cam portions 24 of bell cranks 20 and 21 while the resilient arms 26 extend through a suitable aperture in casing 10 to make frictional engagement with the surface of shutter 17. The grid member 29 is normally held in position between the lamp 12 and condenser lens assembly 13 by virtue of the weight 28 and a lug 32 extending inwardly from lamp housing 11. The location of hole 31 with respect to the center gravity of the screen member insures that the same will normally be in contact with lug 32 and with the grid 29 in proper shielding position. The walls of lamp housing 11 are cut away to allow free axial and rotational movement of the screen member.

The operation of the safety screen according to the present invention will be described hereinafter:

When the motion picture apparatus is operated, shutter shaft 16 rotates and for the purposes of the illustrated embodiment rotates in the direction of the arrow shown in Fig. 1. The disc shutter 17 and bell cranks 20 and 21 are also rotated, but at low speeds the frictional engagement between resilient arms 26 and the surface of shutter 17 is not sufficient to overcome the action of weight 28 and the screen member remains in normal or protecting position. As the rotational speed of shutter shaft 16 is increased the weights 23 on bell cranks 20 and 21 fly apart by virtue of the centrifugal forces created therein. Bell cranks 20 and 21 rotate about pin 22 so that the cam portions 24 of the bell cranks move the screen member axially along shutter shaft 16 against the action of resilient arms 26. This axial movement of the screen member increases the frictional engagement between resilient arms 26 and the surface of shutter 17 until said frictional engagement attains such a value that the gravitational effect of weight 28 is overcome. The screen member is then moved in the direction of shutter rotation, which according to the illustration is counter clockwise, and the grid member 29 is moved out of the light beam between lamp 12 and condenser lens assembly 13. Conversely, when the shaft 16 becomes stationary the resilient arms 26 overcome the action of weights 23 on bell cranks 20 and 21, which are brought together, the screen member moves axially along shaft 16 and the frictional engagement between arms 26 and the shutter 17 is decreased to such an extent that weight 28 now predominates and moves the grid 29 into normal or protective position between lamp 12 and condenser lens assembly 13.

It should be noted that although the basic ideas and elements of the present invention are already known to the motion picture art, still the simplicity of construction and certainty of operation present a considerable advance in the provision of safety screens. Obvious changes or modifications of the illustrated construction are deemed to be within the scope of the present invention, the disclosure herein given being for illustrative purposes only.

Having now particularly described my invention, what I claim as new and desire to secure by Letters Patent of the United States is:

1. In a motion picture apparatus provided with an aperture, the combination with a disc shutter adapted to be rotated about an axis, of a screen member normally covering said aperture, axially movable with respect to said disc shutter and including integral resilient means in direct frictional engagement with said disc shutter, and a centrifugal means adapted upon attaining a predetermined speed axially to move said screen member against the action of said integral resilient means to increase the frictional engagement between said disc shutter and said screen member so that the screen is moved to uncover said aperture.

2. In a motion picture projector provided with a projection aperture, the combination with a disc shutter adapted to be rotated about an axis, of a screen member axially movable with respect to said disc shutter, including a grid member normally covering said aperture and including resilient arms in frictional engagement with said disc shutter, and a centrifugal means adapted upon obtaining a predetermined speed directly to move said screen member axially against the action of said resilient arms to increase the frictional engagement between said disc shutter and said resilient arms so that the grid member is moved to uncover said aperture.

3. In a motion picture apparatus provided with an aperture, the combination with a shutter member adapted to be rotated, of a screen member normally covering said aperture and in frictional engagement with said shutter member, and a centrifugal means including a pair of bell cranks intermediately pivoted about a common axis, each having a weighted arm and a cam portion adapted to increase said frictional engagement between the screen member and shutter member upon rotation of said bell cranks whereby said screen member is moved to uncover said aperture.

4. In a motion picture apparatus provided with an aperture, the combination with a shaft adapted to be rotated and a shutter member mounted thereon, of a screen member normally covering said aperture and in frictional engagement with said shutter member and a centrifugal means including a pair of bell cranks intermediately pivoted on said shaft about a common axis, each bell crank having a weighted arm and a cam portion on the other arm adapted to engage and move said screen member upon rotation of said bell cranks whereby said screen is moved to uncover said aperture.

5. In a motion picture apparatus provided with an aperture, the combination with a shaft provided with an end slot and a shutter member mounted on said shaft, said shaft and shutter member being adapted to be rotated, of a screen member normally covering said aperture and in frictional engagement with said shutter member and a centrifugal means including a pair of bell cranks and a pin extending through the end slot of the shaft and intermediate portions of said bell cranks, each bell crank having a weighted arm and a cam portion on the other arm adapted to engage and move said screen member axially with respect to said shaft during rotation thereof.

6. A screen member for a motion picture apparatus having a rotatable disc shutter, comprising a central portion, a weighted arm extending therefrom, a grid member extending from said central portion substantially opposite said weighted arm and a plurality of resilient arms bent out of the plane of said central portion and adapted frictionally to engage said disc shutter.

7. A screen member for a motion picture apparatus having a rotatable disc shutter, comprising a central portion, a weighted arm extending therefrom, a grid member extending from said central portion substantially opposite said weighted arm and a plurality of resilient arms bent out of the plane of said central portion and adapted frictionally to engage said disc shutter, said central portion being provided with a hole between the grid member and the center of gravity of the screen member.

8. In a motion picture apparatus provided with an aperture, the combination with a shutter member mounted for rotation about an axis, of a screen member normally in juxtaposition with respect to said aperture, and having a portion displaced from the plane of said screen member and axially movable for direct frictional engagement with said shutter member, and a centrifugal means rotatable with said shutter member and adapted upon attaining a predetermined speed axially to move said screen member and to create sufficient frictional engagement between said shutter member and the displaced portion of said screen member for movement of said screen member out of normal position and away from said aperture.

9. In a motion picture apparatus, the combination with a casing provided with an aperture, and a shutter member mounted to rotate about an axis, a screen member mounted co-axially and for axial movement with respect to said shutter member and movable to a position opposite said aperture, a stop means for engaging said screen member and located to abut the same when said screen member is in said position opposite said aperture, a means associated with said screen member for normally moving said screen member into abutment with said stop means, and a centrifugal means rotatable with said shutter member and adapted upon attaining a predetermined speed axially to move said screen member against said shutter member and to create sufficient frictional engagement therebetween to move said screen member out of normal position and away from said aperture.

10. In a motion picture apparatus, the combination with a casing provided with an aperture, and a shutter member mounted to rotate about an axis, a screen member mounted co-axially and for axial movement with respect to said shutter member and movable to a position opposite said aperture, and having a portion displaced from the plane of said screen member adapted upon axial movement of the screen member directly and frictionally to engage said shutter member, a stop means for engaging said screen member and located to abut the same when said screen member is in said position opposite said aperture, a means associated with said screen member for normally moving said screen member into abutment with said stop means, and a centrifugal means rotatable with said shutter member and adapted upon attaining a predetermined speed axially to move the displaced portion of said screen member against said shutter member and to create sufficient frictional engagement therebetween to move said screen member out of normal position and away from said aperture.

11. In a motion picture apparatus, the combination with a casing provided with an aperture, and a shutter member mounted to rotate about an axis, a screen member mounted co-axially and for axial movement with respect to said shutter member and movable to a position opposite said aperture, and having a portion displaced from the plane of said screen member adapted upon axial movement of the screen member directly and frictionally to engage said shutter member, a stop means for engaging said screen member and located to abut the same when said screen member is in said position opposite said aperture, a counter-weight on said screen member for normally moving said screen member into abutment with said stop means, and a centrifugal means rotatable with said shutter member and adapted upon attaining a predetermined speed axially to move the displaced portion of said screen member against said shutter member and to create sufficient frictional engagement therebetween to move said screen member out of normal position and away from said aperture.

12. In a motion picture apparatus provided with an aperture, the combination with a shutter member adapted to be rotated, of a screen member normally in a position opposite said aperture, axially movable and adapted frictionally to engage said shutter member, and a centrifugal means rotatable with said shutter member and including a pair of bell cranks which are intermediately pivoted, each bell crank having a weighted arm and a cam portion which is adapted to engage said screen member and which upon attainment of a definite speed of rotation of the centrifugal means moves said screen member toward said shutter member to create sufficient friction therebetween for movement of said shutter member out of said position opposite said aperture.

13. A screen member for a motion picture apparatus having a rotatable disc shutter member comprising a central portion, a weighted arm extending therefrom, a grid member extending from said central portion substantially opposite said weighted arm, and a displaced portion out of the plane of said central portion and adapted frictionally to engage said disc shutter member.

14. A screen member for a motion picture apparatus having a rotatable disc shutter member comprising a central portion, a weighted arm extending therefrom, a grid member extending from said central portion substantially opposite said weighted arm, and a displaced portion out of the plane of said central portion and adapted frictionally to engage said disc shutter member, said central portion being provided with a hole between the grid member and the center of gravity of the screen member.

HOWARD C. WELLMAN.